June 15, 1965
C. C. HANSEN
3,189,041
REFRIGERATION PRESSURE REGULATOR
Filed March 5, 1962
2 Sheets-Sheet 1
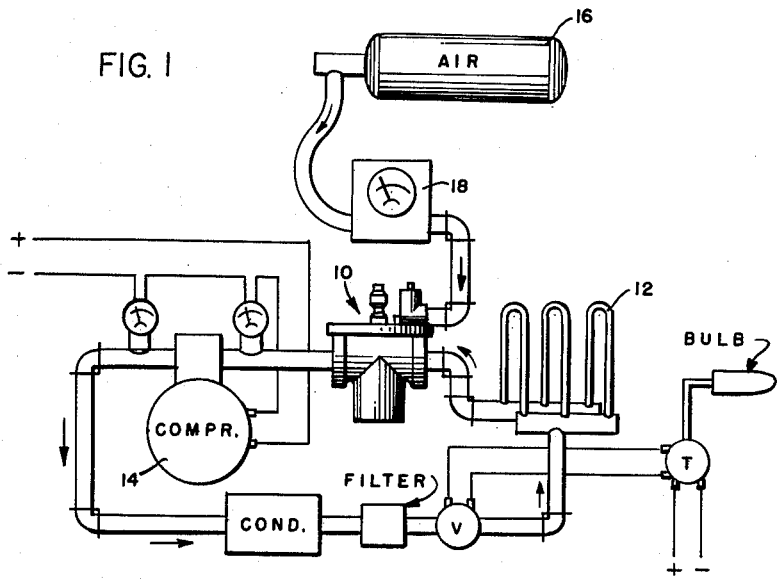
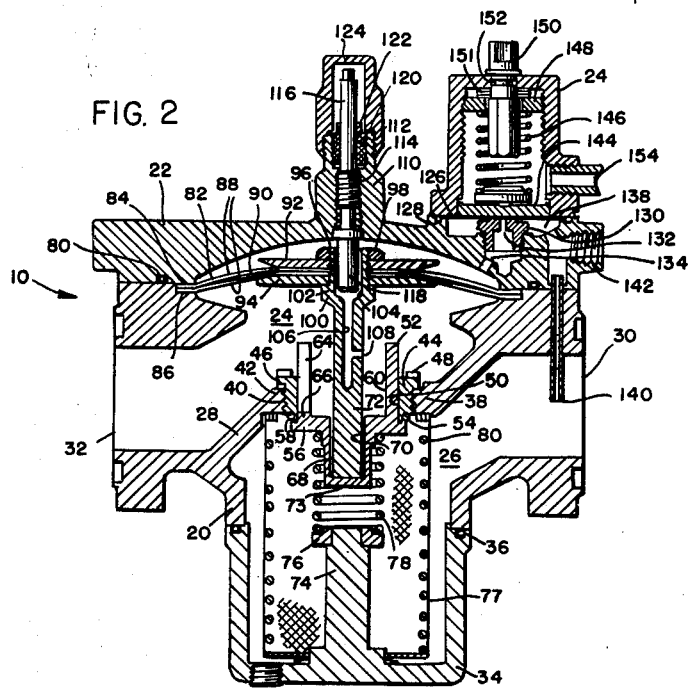
INVENTOR:
CHARLES C. HANSEN
BY
ATT'Y June 15, 1965  C. C. HANSEN  3,189,041
REFRIGERATION PRESSURE REGULATOR
Filed March 5, 1962  2 Sheets-Sheet 2
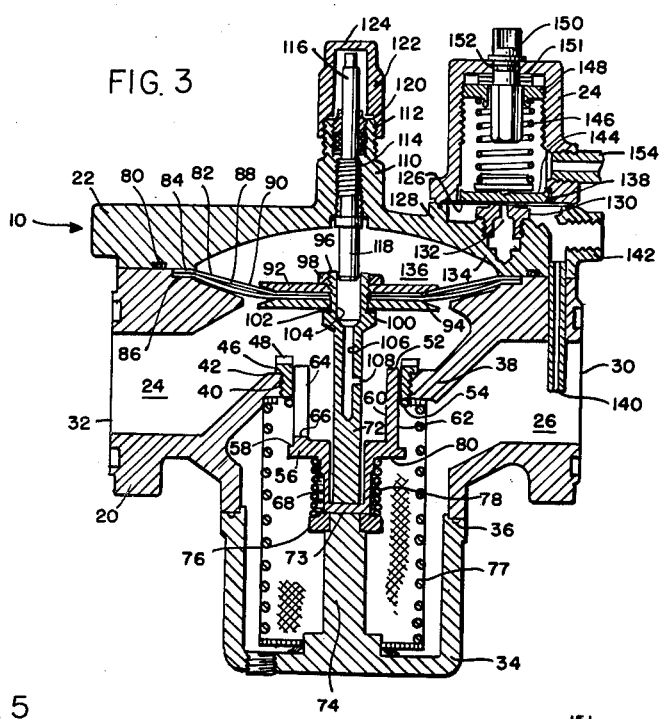
INVENTOR:
CHARLES C. HANSEN
BY
ATT'Y

United States Patent Office 3,189,041
Patented June 15, 1965

3,189,041
REFRIGERATION PRESSURE REGULATOR
Charles C. Hansen, Clarendon Hills, Ill., assignor to Refrigerating Specialties Company, Chicago, Ill., a corporation of Illinois
Filed Mar. 5, 1962, Ser. No. 177,490
10 Claims. (Cl. 137—489.5)

This invention relates in general to pressure control valves for refrigeration systems and in particular to an improved automatic pressure regulator which maintains a predetermined constant pressure in an evaporator of an otherwise conventional refrigeration system.

A pressure regulating valve embodying the invention is located in the suction line of a refrigeration system between the compressor and the evaporator. Its adjustment is related to the pressure of the refrigerant in the evaporator to maintain a pressure level therein corresponding to a desired temperature factor. As refrigerant vaporizes in the evaporator under a varying refrigeration load the pressure in the evaporator tends to vary. The compressor capacity is preferably great enough to handle maximum load, but as the load falls off, vaporization diminishes and tends to lower the evaporator pressure beyond the valve. Under these diverse pressure variation tendencies the valve must operate to prevent the pressure within the evaporator from rising above or falling below the level for which it is set in order to prevent overheating or overchilling as where a different temperature might be detrimental to any refrigeration process involved.

Prior evaporator pressure regulating valves have failed to adequately control the pressure in the evaporator and have been subject to failures and expensive repairs during operation.

More particularly, in view of the fact that an evaporator pressure regulating valve is controlling refrigerant expansion, it may be located where it is continually subjected to extremely cold temperatures. Pressure actuated pistons and linkages have been used heretofore to open and close a valve to control the work of the refrigerant and it was necessary to make the piston-cylinder relationship a close fit in an endeavor to obtain some sensitivity and a positive flow control found to be desirable. Due to these minimum dimensional tolerances between the piston and cylinder, pistons have a tendency to freeze or be sluggish in the presence of minute foreign particles and viscous oil.

Another shortcoming of prior evaporator pressure regulating valves was the lack of adequate sensitivity and stability. Actuation of these prior pressure regulating valves required such a large pressure differential to actuate them that maintaining an acceptably constant temperature was virtually impossible. Further, undesirable pressure variances within the evaporator was often experienced since leakage through the regulating valve often occurred due to misalignment of the valve with the valve seat, improper or non-seating of the valve at different pressure levels and failure of the valve seal to perform properly.

An additional characteristic of a refrigeration system which has considerable influence on valve design and valve operation is the refrigerant-oil relationship. The necessity of lubricating the frictional surfaces of the compressor, including bearings, pistons and valves, is the essential reason for the presence of oil in a refrigeration system. Because the refrigerant and the oil ultimately become exposed to each other, by either accident or design, it is essential that they be compatible, both chemically and physically, in order to avoid deterioration of one by the other.

An important physical quality affecting the refrigerant-oil relationship is that of miscibility, or the ability of a refrigerant to mix with oil. Many refrigerants are miscible with lubricating oil in all proportions. A few mix with oil to a slight degree while others do not mix at all. This characteristic influences not only the total overall operation of the refrigeration system, but also is a primary factor in the design of refrigeration equipment.

The effect of miscibility is to decrease the viscosity of the oil, that is, to render the lubricating oil thinner by dilution. Therefore, to counteract the effect of such dilution, it is necessary to employ a heavier bodied oil for the lubrication of the compressor parts in refrigeration systems using a miscible refrigerant, more so than in the case of an immiscible refrigerant.

Any lubrication of valves within the system usually depends on the ability of the refrigerant to carry sufficient oil to their sliding surfaces. If continuously operated dry, undue wear occurs in the valves resulting in the necessity of constant repair and replacement.

The problem heretofore of adequate valve lubrication was really overcome with the use of miscible refrigerants. But, as is well known, the loss in volume of refrigerant handled by the compressor due to oil-vapor displacement remains one of the primary disadvantages presented by miscible refrigerants.

It is therefore the primary object of this invention to provide an improved pilot operated pressure regulating valve arrangement for use in maintaining a constant pressure in an evaporator of a refrigeration system which eliminates the shortcomings and disadvantages of conventional valves.

It is a specific object of this invention to provide an improved pilot operated pressure regulator for automatic control of a refrigerant utilizing a pressure actuated diaphragm for controlling the valve flow area.

Another object of this invention is to provide an improved pilot operated pressure regulator which utilizes a diaphragm in place of a conventional piston thus eliminating the necessity of a lubricant for frictional surface to surface sliding contact between metallic components.

A further object of this invention is to provide a valve actuating means which is not likely to jam or be adversely affected by the dirt, soil and sludge present in refrigeration systems employing conventional refrigerants.

A still further object of this invention is to provide an improved valve actuating means which can induce valve motion other than the normal reciprocating valve movement whereby the valve can more readily be maintained in a free operating condition in the presence of contamination where conventional valves would stick.

Another object of this invention is to provide an improved pilot operated pressure regulator valve having a balanced construction permitting functional operation of the valve regardless of the attitude in which the valve is mounted in a refrigeration system.

A further object of this invention is to provide an improved pilot operated pressure regulating valve construction which permits passage of refrigerant, having a minimum of oil entrained therein, to the actuating portions of the valve regardless of the attitude in which the valve is mounted or whether the refrigerant is miscible or immiscible with oil.

A further object of this invention is to provide an improved pilot operated pressure regulator utilizing a diaphragm for actuation of the valve which provides an increased effective pressure area relative to the flow area whereby the desired valve sensitivity and stability are attained with the valve moving towards the wide open position at pressure differentials as low as .5 p.s.i.

Another object of this invention is to provide an improved pilot operated pressure regulator which is simple in design, readily assembled and disassembled with a minimum of effort and equipment, rugged in construction and economical to manufacture.

Many other advantages, features and additional objects of the present invention will become apparent to those versed in the art upon making reference to the detailed description and the accompanying sheets of drawings in which the preferred structural embodiments, incorporating the principles of the present invention, are shown by way of illustrative example.

In the drawings:

FIG. 1 is a pictorial schematic of a simple conventional refrigeration system illustrating the evaporator pressure regulating valve of this invention mounted between the evaporator and compressor;

FIG. 2 is a sectional view in side elevation illustrating the relationship of the component parts of a pressure regulating valve when in the closed position;

FIG. 3 is a sectional view in side elevation illustrating the relationship of the component parts of the pressure regulating valve of this invention when the valve is in the wide open position;

FIG. 4 is a view in side elevation illustrating an alternate construction of the valve of this invention with a pilot valve shown in the remote positon; and FIG. 5 is an enlarged fragmentary sectional view illustrating the sealing relationship of the valve when in the closed position.

By way of generalization for a better understanding of the detailed description to follow, the valve of this invention is primarily characterized by the utilization of a diaphragm for moving the valve from the closed to open position permitting the flow of refrigerant therethrough to complete the circuit of a refrigeration system and maintain a predetermined evaporator pressure. The diaphragm, even though in constant contact with the refrigerant and lower temperatures, remains sufficiently flexible at all times to be moved by a pressure on one side to unseat a valve plug to permit flow of the refrigerant therethrough.

Another salient feature characterizing the pressure regulating valve of this invention is the elimination of all precision, closely fitting mating parts that necessitate the undesirable oil entrained in the refrigerant.

Referring now to the drawings, specifically FIG. 1, the pressure regulating valve 10 of this invention is disposed in a refrigeration system between an evaporator 12 and the inlet of a compressor 14. The balance of the system illustrated in FIG. 1 is by way of simple example only to correlate the relative position of the valve of this invention with the other conventional refrigeration components of a refrigeration system.

The valve 10 is capable of control by either manual adjustment or through air pressure from a tank 16 of compressed air connected to the valve with the air pressure regulated by an air controller 18. Control of the valve 10 through the use of air pressure and the advantages of remote operation will be readily understood as the detailed construction of the valve is described.

Referring now to FIGS. 2 and 3, the valve 10 comprises a body section 20, a cover plate 22 and a pilot regulating valve 24; each of which have their outer shell formed, preferably by casting, from a lightweight metal, such as aluminum alloy, which is capable of withstanding the range of pressures and temperature variations to be experienced in the refrigeration system.

The body section 20, which comprises the lower portion of the valve 10, is substantially divided into two equal chambers, an upper chamber 24 and lower chamber 26, by a diagonal partition wall 28 integral with the body section 20.

An inlet port 30 is formed in one side of the body 20, providing direct communication with the lower chamber 26. In similar manner, an outlet port 32, preferably of similar configuration as the inlet port 30, is formed in the body 20 to provide direct communication to the upper chamber 24. For ease of connection of the valve in the refrigeration system, it is preferable to have the outlet port 32 directly opposite the inlet port 30.

The lower portion of the body section 20 and the chamber 26 are sealed by a cover member 34. The cover member 34 is secured to the body section by a plurality of bolt members (not shown) with a seal ring 36 disposed between their mating edges.

The partition wall 28 provides a centrally disposed horizontal portion 38 through which a threaded aperture 40 is formed. The upper surface of the horizontal portion 38 provides a smooth surface for sealing engagement with one side of a seal ring 42.

Referring more specifically to FIG. 5, a valve seat 44 is threadably received in the aperture 40 with an upper lip portion 46 engaging the other side of the seal ring 42 to form a leakproof seal relationship between the valve seat and the partition wall 28. Slots 48 may be formed in the upper surface of the valve seat to facilitate installation and possible subsequent removal of the valve seat within the valve.

The valve seat 44 provides a smooth opening 50 concentrically formed therethrough for receipt of a valve plug 52 in sliding relationship. The lower edge of the valve seat 44 has a groove concentrically formed therein for receipt of a seal ring 54. The seal ring 54, preferably formed from "Teflon," is anchored in the groove to provide a sealing surface for a contoured lip, to be explained, on the valve plug 52.

The valve plug 52, as previously mentioned is reciprocally mounted in the valve seat 44, provides a centrally disposed land 56 having an upper lip 58 for sealing contact with the seal ring 54 when the valve is in the closed position. The lip 58 preferably provides a sharp contour to insure positive sealing engagement with the seal ring 54. To insure a positive continual sealing relationship between the seal ring 54 and the lip 58, the lower planar surface of the seal ring 54 is disposed normal to the side wall of the opening 50 in which the valve plug 52 is guided in sliding relationship.

An upper portion 60 of the valve plug 52, integral with the land 56, is cylindrical in configuration with the side wall 62 having a plurality of equally spaced V slots 64 formed therein with the apexes 66 thereof adjacent the upper surface of the land 56. The function and advantages of the V slots 64 will become apparent as the description continues and the mode of operation of the valve is described.

Referring now to FIGS. 2 and 5, the lower portion 68 of the valve plug 52, integral and concentrically formed with the land 56, is of cylindrical configuration of substantially reduced diameter relative to the diameter of the land 56. The lower portion 68 provides a central opening 70, for receipt of a valve stem 72, to be explained, which bottoms against a lower wall 73 of the lower portion 68.

The cover 34, disposed over the lower portion of the body 20, provides a centrally disposed stop 74 which limits the travel of the valve plug 52 as it moves in a downwardly direction to an open position. A spring retainer 76 is secured on the upwardly extending end of the stop 74 to receive one end of a compression spring 78. The other end of the compression spring 78 encircles the lower portion 68 of the valve plug and bears against a shoulder 80 formed on the valve plug due to the reduction in diameter of the lower portion 68. A suitable filter screen 77 is positioned within the chamber 26 between the inlet port and the valve seat 52.

The spring 78 continually urges the valve plug 52 towards the closed position, shown in FIG. 2, and insures that the valve plug is in continual contact with the end of the valve stem 72. The rate of spring 78, as is well known in the art, is a principal factor in valve operation in determining the flow rate, the minimum pressure drop to open the valve plug, and the closing reliability.

The upper portion of the body section 20 and the chamber 24 are sealed by a cover plate 22. Plate 22 is secured to the body section 20 by a plurality of spaced apart bolts (not shown) with a seal ring 80 disposed between the two mating surfaces to provide a leakproof seal between the cover plate and the body section.

A diaphragm 82 is secured about its periphery between cooperating flanges 84 and 86 formed on the plate 22 and body section 20, respectively. The diaphragm is preferably of laminated construction having similar upper and lower layers 88 formed from a synthetic rubber with each layer being bonded to a center layer 90, formed from a woven fabric. The synthetic rubber utilized for the upper and lower layers is a compound suitable for resisting deterioration by the refrigerant and any oil passing through the valve and is capable of maintaining sufficient flexibility for valve operation at temperatures from $-50°$ F. to $-100°$ F. Several commercially known compounds, such as, Silicone compound SE555, Dow Corning compound LS63 and S-2096U and Anchor Packing Company Neoprene Rubber 30-N-56, all provide the desired characteristics to properly function throughout the entire range of pressures and temperatures required by the valve 10.

The fabric material for the center layer 90 must also withstand refrigerant and oil attack, remain flexible at low temperatures and be completely capable of thorough bonding to the synthetic upper and lower layers. Again there are several commercial compounds available having the desired characteristics, such as, nylon, dacron and fabrics from fibre glass of suitable strength.

The diaphragm 82 is supported at its center by mating upper and lower backup plates 92 and 94 in sandwich relationship and receive centrally therethrough a threaded upper end portion 96 of the valve stem 72. The diaphragm is securely clamped in sealed relationship between the upper and lower backup plates by a nut member 98 threaded on to the upper end 96 of the stem and is forced downwardly against the upper backup plate with the lower backup plate secured against downward axial movement by a shoulder 100 formed on the stem 72. To prevent leakage between the stem and the diaphragm, a suitable seal ring 102 is disposed between the mating surfaces of the shoulder 100 and the under surface of the lower backup plate 94.

The valve stem 72 provides a large central opening 104 formed concentrically in the upper end thereof which extends into the valve stem a substantial distance and then reduces in diameter forming a passage 106 which extends further into the stem. A channel 108, formed in the side of the valve stem at right angles to the center line of the passage 106, connects with the passage 106 at a point substantially above the bottom or lowermost point of the passage. The portion of the channel 106 below the intersection of channel 108 serves as a trap for foreign particles which might possibly flow through the stem.

The cover plate 22 provides a centrally disposed boss 110 having an externally threaded upper end 112 with a concentrically threaded aperture 114 formed therethrough. An adjustment stem 116, threadbly received in the aperture 114, provides a lower guide tip 118 which is received within the opening 104 for sliding engagement with the upper end of the valve stem 72. The upper end of the adjustment stem extends upwardly through a sealing member 120 and a locking nut 122. A cover cap 124 is disposed over the extending end of the adjustment stem and threadably engages the upper end 112 of the abutment 110.

The pilot valve 24 is secured to the cover plate 22 by a plurality of bolts (not shown) with the mating surfaces thereof securing the periphery of a metallic diaphragm 126 and bearing against a seal ring 128.

A pilot seat 130 is positioned below the diaphragm 126 and threadably secured in the cover plate in a manner to provide the upper flat surface of the pilot seat 130 in physical contact with the under surface of the diaphragm 126 when the diaphragm is in a normal horizontal position. The pilot seat provides a centrally formed flow orifice 132 therethrough which connects with a channel 134 leading directly to a chamber 136 above the diaphragm 82.

A chamber 138 surrounds the pilot seat 130 below the metallic diaphragm 126 which is interconnected with the inlet port 30 of the valve 10 by a pressure pickup tube 140. As readily seen in the drawings, the pickup tube 140 has its lower end extending into the centermost point of the inlet port 30. An external pressure inlet tap 142 is provided in the cover plate which connects with the chamber 138 for attachment of a pressure indicating device if desired.

By having the extremity of the pressure pickup tube 140 centrally disposed in the inlet port 30, the amount of detrimental foreign material in contact with the valve actuating members will be materially reduced. Further, it is readily understood that the flow through the tube 140 will be constant in whatever attitude the valve is mounted.

A diaphragm follower 144, having curved outer edges, is centrally positioned on top of the metallic diaphragm 126 and is retained in sliding relationship within the valve housing side walls. The follower 144 is resiliently held against the diaphragm 126 by a pilot compression spring 146. The spring 146 has its other end in contact with a spring retainer 148 threadably received within the pilot valve housing. The spring retainer 148 is rotated by a drive member 150 which extends upwardly through a travel limit stop 151 and a sealing member 152 with the upper end thereof exposed above the pilot valve housing for ease of adjustment. As is readily understood by the adjustment of the drive member 150 repositioning the spring 146, the pressure at which the pilot valve will actuate may be varied, thus permitting a change in the pressure level of actuation for the valve 10.

An external pressure tap 154 is provided through the side wall of the pilot valve housing above the metallic diaphragm 126 to permit operation of the pilot valve by air pressure which facilitates operation of the pilot valve from a remote position.

Referring now specifically to FIG. 4, an alternate embodiment of the pressure regulating valve of this invention is illustrated and is substantially the same construction as the preferred embodiment just described except the pilot valve 24 is illustrated as being remotely positiond from the valve 10. This is accomplished by providing pressure taps to the channels 134 and to the pressure pickup tube 140 in the cover plates as indicated by the numerals 156 and 158. Flexible or rigid conduit, as desired, may be extended to the remotely positioned pilot valve 24 for connection with mating taps 160, leading directly to the pilot valve seat, and pressure tab 162, connecting directly to the chamber 138.

The valve 10 as shown in FIG. 4 provides a substantially more compact structure by the elimination of the lower cover 34 with the lower portion of the body 20 being integral with the rest of the housing. A conventional filter device may be mounted in the system prior to the inlet port 30 to properly filter the refrigerant since the filter screen 77 is not provided in this embodiment.

Having described in detail the construction of the several component parts, the invention will become more apparent from the following description of the movement, function and relationship of the component parts during operation of the valve.

Assuming the valve is in the normally closed position, as shown in FIG. 2, and a pressure build up has occurred in the evaporator 12. When the inlet pressure in port 30, being sensed in the chamber 138 through the pickup tube 140 and acting against the under surface of the metallic diaphragm 126 exceeds the pressure setting of the pilot valve 24, the diaphragm 126 will be forced upwardly permitting flow through the pilot valve seat 130 into the chamber 136 above the diaphragm 82. Upon sufficient pressure build up in the chamber 136, the diaphragm 82 will be flexed downwardly causing the valve stem 72 to force the value plug 52 away from the valve seat 44, as shown in FIG. 3. As the valve plug 52 moves away from the valve seat 44, refrigerant flow is permitted from the chamber 26 to the chamber 24 and out the outlet port 32. When sufficient flow has reduced the pressure in the evaporator to the desired level, the force of pilot valve spring 146 will cause the diaphragm 126 to seal off the flow through the pilot seal 130.

To insure refrigerant is not trapped in the chamber 136 above the diaphragm 82 when the pilot seat 130 is sealed off, which would prevent the return of the valve plug 52 to the closed position, the opening 104 connecting with the passage 106 which in turn interconnects with the channel 108 serves as a bleed pasasge from chamber 136 above the diaphragm 82 to the chamber 24 below the diaphragm 82.

Therefore, upon the sealing off of the flow from the pilot valve seat 130, the pressure in the chamber 136 will drop, as it is bled into the chamber 24, thus permitting the compression spring 78 to move the valve plug 52 to the closed position.

As previously mentioned, the pilot valve 24 controls the operation of the valve 10 and maintains the pressure level in the evaporator 12. By providing for operation of the pilot valve 24 with spring adjustment at the valve and/or air pressure remotely controlled, various pressure levels in the evaporator may be easily and quickly accomplished from any convenient location.

Referring now briefly to FIG. 3, it is to be noted that the dimensional spacing between the lowermost edge 73 of the valve plug 52 and the upper surface of the stop 74 is such that it is impossible for the guide tip 118 of the adjustment stem 116 to leave the opening 104 in the upper end of the valve stem.

It is therefore seen that the valve plug 52 is held in alignment with the valve seat by the upper portion of the valve stem and is guided by he valve seat at the lower end. Further, as previously mentioned, the guiding of the valve plug does not require precise, closely fitted mating parts since the sharp contour on the valve plug has sufficient area on the seal ring to form a positive seal, even if there should be minute lateral movement of the valve plug. The increased or open tolerance between the valve plug and the guiding valve seat permits passage of foreign particles which would cause a conventional valve to jam. Further, as previously mentioned, the loose sliding fit between the valve plug and the guiding surface of the valve seat permits the flexing of the diaphragm to transmit a minute wobbling motion to the valve plug which readily frees the valve plug if dirt particles should cause a jam or sticking of the valve plug.

The oil found in the refrigerant passing through the valve has heretofore been referred to as a necessary evil in that valves of this character require oil for lubircation but the oil also reduced valve operation and efficiency by congealing at low temperatures and causing sluggish operation. By the installation of the diaphragm 82 in combination with the comparatively loose fit of the valve stem guide, which has a flow of refrigerant therebetween during operation, the pressure regulating valve of this invention requires no lubrication. In view of the detrimental effect that oil has in the refrigeration system and since it is virtually impossible to remove all the oil before the refrigerant reaches the valve, it has been found that by extending the end of the pickup tube 140 to the centermost point of the inlet port 30, here will be a minimum of oil transmitted to the pilot valve and above the diaphragm 82 to effect the operational efficiency of the valve. Not only will a minimum amount of oil pass upwardly through the pickup tube, but virtually no foreign articles such as dirt, lint, metal filings, etc., will ever reach the pilot valve or the upper surfaces of the diaphragm 82.

The adjustment stem 116 provides a means to manually set the valve plug 52 to the open position for taking care of possible emergencies due to failure of the pilot valve or for servicing of the down stream portion of the system by bleeding off pressure in the evaporator. As readily understood, the adjustment stem 116 not only functions to permit manual opening and setting of the valve, but also serves as a guiding element for the upper portion of the valve stem as previously described.

The bleed passage consisting of the opening 104, the passage 106 and channel 108 formed essentially in the upper portion of the valve stem as previously described permits the pressure to bleed off from above the diaphragm and during operation permits a smoothing out of dampening of the movement of the diaphragm 82. When the valve 10 is in the closed position, as seen in FIG. 2, the bleed passage permits pressure equalization on both sides of the diaphragm 82.

As briefly mentioned before, the flow area presented by the valve seat 44, relative to the enlarged pressure area of the diaphgram 82, permits increased sensitivity to valve movement and requires only a minute pressure differential to cause actuation of the valve. Further, by providing the apexes 66 of the V slots 64 adjacent the lip 58 on the plug, the ratio of area through which flow may pass relative to the distance traveled by the valve plug rapidly increases with maximum opening being derived when the valve plug has reached the maximum travel position illustrated in FIG. 3.

It is thus readily apparent to those skilled in the art that the pressure regulating valve of this invention for regulating the pressure in the evaporator of a refrigeration system presented herewith, completely eliminates the detrimental effects derived from utilizing a close fitting piston and coupling linkages for actuation of the valve by utilizing a flexible diaphragm. The longevity of the valve has been greatly increased due to the elimination of the necessity of lubrication and by permitting only the refrigerant to come in contact with the functional operating parts, valve sensitivity and stability are mentioned at the highest level at all times. Although only one primary embodiment of the invention has been illustrated with possible variations illustrated and described, various changes in the construction, geometrical relationship and functional features of the component parts may be made to suit requirements.

The geometrical relationship and cooperation of the component parts readily permits the valve of this invention to function at maximum efficiency regardless of the attitude in which it is mounted. The inherent movements of the actuating diaphragm are advantageously employed in conjunction with the free fitting mating parts of the valve to maintain the valve in free operating condition and virtually free the valve automatically if a jam should occur.

It is to be understood that such changes in detail may be resorted to without departing from the field and scope of this invention and it is intended to include all such variations, as fall within the scope of the appended claims.

What is claimed is:

1. In a pressure regulating valve for maintaining a predetermined refrigerant pressure at its inlet comprising:
    a housing having a partition wall dividing it into an inlet chamber and an outlet chamber with inlet and outlet ports,
    said partition having an aperture therethrough interconnecting the chambers,
    a valve seat member in said aperture and having a port opening extending into the outlet chamber from a valve seat located at the inlet end thereof,
    a valve plug having a castellated cylindrical end portion reciprocably guided in said port opening and a radial land therebelow engaging said valve seat intermediate its length, said valve plug having a boss disposed in the inlet chamber defining a central well facing the outlet chamber, said well extending back through and beyond said land into said inlet chamber, a valve stem having an end portion received in guided relationship and bottoming in said well for moving said valve plug to open position and at the other end having a large central opening, a flexible diaphragm secured centrally to said other end and marginally to the housing and defining a sealed pressure chamber in communication with said central opening and being exposed on opposite sides to the pressures in the sealed chamber and outlet chamber, a guide tip carried by said housing received in said central opening with a sliding fit to support said other end and diaphragm in guided relationship, a bleed passage interconnecting said central opening and outlet chamber to equalize pressures on opposite sides of the diaphragm when the valve plug is closed, and pressure responsive means for admitting pressure in said inlet chamber to said sealed pressure chamber when said pressure exceeds a predetermined amount.

2. The combination called for in claim 1 in which the guide tip is engageable by the valve stem to limit closing movement of the valve plug, and means interconnecting said guide tip and housing for adjusting the position of said guide to hold the valve plug in an open position.

3. In a pressure regulating valve for maintaining a predetermined refrigerant pressure at its inlet the combination:

a housing having a partition wall dividing it into an inlet chamber and an outlet chamber with axially aligned inlet and outlet ports on opposite sides of the housing, said partition having an aperture therethrough interconnecting the chambers, a valve seat member threaded in sealed relationship in said aperture and having a smooth wall port opening extending into the outlet chamber from a valve seat located at the inlet end thereof, a valve plug having a cylindrical end portion reciprocably guided with open tolerances in loose sliding relationship in said port opening for minute wobbling and having a radial land engaging said valve seat intermediate its length and a boss disposed in the inlet chamber defining a central well facing the outlet chamber and extending back through and beyond said land into said inlet chamber.

a stop carried by said housing engaging said boss to limit movement of said valve plug in a valve opening direction, a compression spring around said boss and interconnecting said stop and said land for urging the valve to normally closed position, a valve stem having an end portion loosely received and bottoming in said well for moving said valve plug to open position and at the other end having a large central opening, a diaphragm secured centrally to said outer end and marginally to the housing and defining a sealed pressure chamber in communication with said central opening, a guide tip carried by said housing received in said central opening with a loose sliding fit to support said other end in guided relationship.

4. In a pressure regulating valve for maintaining a predetermined refrigerant pressure at its inlet comprising:

a housing having a partition wall dividing it into an inlet chamber and an outlet chamber with axially aligned inlet and outlet ports, said partition having an aperture therethrough interconnecting the chambers, a valve seat member mounted in sealed relationship in said aperture and having an opening extending into the outlet chamber from a valve seat located at the inlet end thereof, a valve plug having an end portion reciprocably guided in said opening and having a radial land engaging said valve seat, a valve stem carried by said valve plug for moving same to open position, a diaphragm secured centrally to said valve stem and marginally to the housing to define a sealed pressure chamber, a guide carried by said housing to reciprocably support said valve stem in guided relationship, a bleed passage interconnecting the sealed pressure chamber and outlet chamber to equalize pressures on opposite sides of the diaphragm when the valve plug is closed, pressure responsive pilot valve means for admitting pressure in the inlet chamber to said sealed chamber when same exceeds a predetermined pressure, and conduit means connecting said inlet chamber with the pressure chamber and including a pilot valve for controlling the flow of refrigerant to the pressure chamber when the pressure in the inlet exceeds a predetermined level to effect movement of the diaphragm and open the valve plug to the flow of refrigerant through the valve port to the outlet chamber, and an elongated pick-up tube having one end thereof disposed at the centermost point of the inlet opening to receive refrigerant from the center of said inlet opening free of dirt and oil.

5. In a pressure regulating valve for maintaining a predetermined refrigerant pressure at its inlet comprising:

a housing having a partition wall dividing it into an inlet chamber with inlet and outlet ports, said partition having an aperture therethrough interconnecting the chambers, a valve seat member mounted in sealed relationship in said aperture and having a smooth wall port opening extending into the outlet chamber from a valve seat located at the inlet end thereof, a valve plug having a cylindrical end portion reciprocably guided with tolerances in loose sliding relationship in said port opening for minute wobbling and having a radial land engaging said valve seat intermediate its length and a boss disposed in the inlet chamber defining a central well extending back through and beyond said land into said inlet chamber and facing the outlet chamber, a stop carried by said housing engaging said boss to limit movement of said valve plug in a valve opening direction, a compression spring around said boss and interconnecting said stop and said land for urging the valve to normally closed position, a valve stem having an end portion loosely received and bottoming in said well within the confines of said spring for moving said valve plug to open position and at the other end having a large central opening, a guide tip carried by said housing received in said central opening with a loose sliding fit to support said other end of the stem in guided relationship, a diaphragm secured centrally to said other end a distance spaced from said opening to be supported in guided relation thereby and marginally to the housing to define a sealed pressure chamber in communication with said central opening, a bleed passage interconnecting said central opening and outlet chamber to equalize pressures on opposite sides of the diaphragm when the valve plug is closed, conduit means connecting said inlet chamber with the pressure chamber and including a pilot valve for controlling the flow of refrigerant to the pressure chamber when the pressure in the inlet exceeds a predetermined level to effect movement of the diaphragm and open the valve plug to the flow of refrigerant through the valve port to the outlet chamber.

6. In a pressure regulating valve for maintaining a predetermined refrigerant pressure at its inlet comprising:
a housing having a partition wall dividing it into an inlet chamber and an outlet chamber with axially aligned inlet and outlet ports on opposite sides of the housing,
said partition having an aperture therethrough interconnecting the chambers,
a valve seat member mounted in sealed relationship in said aperture and having a smooth wall port opening extending into the outlet chamber from a valve seat located at the inlet end therof,
a valve plug having a cylindrical end portion reciprocably guided with loose sliding tolerances in said port opening for minute wobbling and having a radial land engaging said valve seat intermediate its length and a boss disposed in the inlet chamber defining a central well facing the outlet chamber and extending back through and beyond said land into said inlet chamber,
a stop carried by said housing engaging said boss to limit movement of said valve plug in a valve opening direction,
a compression spring around said boss and interconnecting said stop and said land for urging the valve to normally closed position,
a valve stem having an end portion loosely received and bottoming in said well for moving said valve plug to open position and at the other end having a large central opening,
a diaphragm secured centrally to said other end and marginally to the housing and defining a sealed pressure chamber in communication with said central opening,
a guide tip carried by said housing received in said central opening with a loose sliding fit to support said other end in guided relationship,
a bleed passage interconnecting said central opening and outlet chamber to equalize pressures on opposite sides of the diaphragm when the valve plug is closed,
conduit means connecting said inlet chamber with the pressure chamber and including a pressure compartment in open communication with said inlet chamber and an outlet orifice from the pressure compartment connecting same to said pressure chamber,
pilot valve means disposed in said pressure compartment including a pressure responsive member normally closing the orifice in the direction of flow therethrough for controlling the flow of refrigerant to the pressure chamber when the pressure in the inlet exceeds a predetermined level to effect movement of the diaphragm and open the valve plug to the flow of refrigerant through the valve port to the outlet chamber, and an elongated pick-up tube normal to the axis of said inlet opening having one end thereof disposed at the centermost point of the inlet opening for receiving clean refrigerant from the center point and conducting it to said pressure compartment.

7. In a pressure regulating valve for maintaining a constant refrigerant pressure in an evaporator of a refrigeration system comprising:
a housing divided into an inlet pressure chamber connected to an evaporator and an outlet chamber, said inlet pressure chamber having an inlet port, said outlet chamber havng an outlet port,
a valve seat secured between said inlet pressure chamber and outlet chamber,
a valve plug slidably received in guided relationship in said valve seat to seal against said valve seat when in the closed position,
a valve stem interengaging the valve plug,
a diaphragm mounted in said outlet chamber with its center portion secured to the valve stem and its peripheral portion fixed to the housing to form a wall dividing said outlet chamber into an outlet pressure chamber portion in communication with said outlet port and a pilot pressure chamber portion, said diaphragm being exposed on opposite sides to the respective pressures in said outlet and pilot pressure chamber portions,
means for guiding the upper end of said valve stem including a guide tip carried by said housing and extending into sliding engagement with the valve stem,
channel means to transmit the refrigerant from said inlet opening to said pilot pressure chamber portion including;
a pilot valve to control the flow of refrigerant to said pilot pressure chamber portion to effect movement of the diaphragm to force the valve plug away from the valve seat when the pressure of the evaporator in said inlet chamber and pilot valve is above a predetermined pressure and thereby permit flow of the refrigerant through the valve seat to the outlet chamber.

8. In a pressure regulating valve for maintaining a predetermined refrigerant pressure at its inlet comprising:
a housing having a partition wall dividing it into an inlet chamber and an outlet chamber with inlet and outlet ports respectively,
said partition having an aperture therethrough interconnecting the chambers,
a valve seat member mounted in sealed relationship in said aperture and having a cylindrical wall extending into the outlet chamber from a valve seat located at the inlet end thereof,
a valve plug having a cylindrical wall reciprocably guided in loose sliding relationship in the first mentioned cylindrical wall, said valve plug having a radial land intermediate its length movable towards said valve seat for a closed position and a boss disposed in the inlet chamber defining a central well facing the outlet chamber and extending back through and beyond said land into said inlet chamber, one of said cylindrical walls having radial openings through its adjacent said valve seat,
a seal ring disposed in the lower surface of the valve seat member having a lower planar surface normal to the axis of the valve plug movement and said valve plug engaging the planar surface of the seal ring in its closed position to form a leakproof seal between the inlet side and the outlet side,
a compression spring around said boss and interconnecting said housing and said land for urging the valve to its normally closed position,
a valve stem having one end portion loosely received and bottoming in guided relationship in said well for moving said valve plug to open position,
a diaphragm secured centrally to the other end portion of the valve stem to define therewith a central opening and marginally to the housing to define a sealed pressure chamber in communication with said central opening,
means carried by said housing for reciprocably engaging the other end of the stem in a guided relationship supporting the diaphragm,
a bleed passage interconnecting said central opening and outlet chamber to equalize pressures on opposite sides of the diaphragm when the valve plug is closed.

9. A control valve mechanism for controlling refrigerant pressure at its inlet comprising:
a housing having an inlet side and an outlet side with a flow path therebetween,
a valve seat disposed in said flow path having a smooth wall valve port opening,
a valve plug having a cylindrical portion having an externally smooth wall portion with openings therethrough reciprocably extending through said valve port opening with open tolerances in sliding guided relationship on the smooth wall of the valve port opening,
said valve plug engaging the valve seat to form a leakproof seal between the inlet side and the outlet side,
a valve stem extending through the valve seat interconnected with said valve plug loosely received in engagement at its lower end with the plug beyond the valve seal,
means for supporting the upper end of said stem in guided relationship on the housing,
a diaphragm mounted with its peripheral portion fixed to the housing and its central portion secured to said valve stem,
channel means to transmit the inlet refrigerant pressure to one side of the diaphragm to effect the movement thereof to move said valve plug to the open position permitting flow of refrigerant from the inlet side to the outlet side, and
a spring member telescoping over said valve plug around the extending portion of the valve stem and disposed between the under surface of said valve plug and the housing to return the valve plug to a normally closed position when the inlet refrigerant pressure decreases to a predetermined level.

10. In a pressure regulating valve for maintaining a predetermined refrigerant pressure at its inlet in a refrigeration system comprising:
a housing having an inlet chamber and an outlet chamber with a flow path therebetween including a valve port conduit on the outlet side of a valve seat,
a main valve means disposed with an open tolerance in slidably guided relationship on the wall of said valve port conduit for minute wobbling,
resilient means between said housing and main valve means for urging it to its closed position,
a diaphragm mounted with its peripheral portion fixed to the housing to form a flexible dividing wall between the outlet chamber and a pilot pressure chamber,
means for supporting the upper end of said stem in guided relationship on the housing,
a valve stem slidably engaging the main valve means in guided relationship at one end within said valve port conduit and secured to the diaphragm at the other end for actuation thereby for moving the main valve means to its open position,
channel means connecting said inlet chamber with the pilot pressure chamber including a pressure compartment in open communication with said inlet chamber and an outlet orifice from the pressure compartment connecting same to said pilot pressure chamber,
pilot valve means disposed within said channel means including a pressure responsive member for closing the orifice in the direction of flow therethrough, pressure means for actuating said pressure responsive member to control the refrigerant flow to the pilot pressure chamber to effect movement of the diaphragm to open the main valve means permitting flow of said refrigerant from the inlet chamber to the outlet chamber when the pressure in the inlet chamber exceeds a predetermined pressure,
said valve stem having a refrigerant flow passage formed therein connecting the pilot pressure chamber with the outlet chamber for equalizing pressures therebetween when said pilot valve means is closed.

References Cited by the Examiner
UNITED STATES PATENTS

| | | | |
|---|---|---|---|
| 1,918,602 | 7/33 | Joyce | 137—484.8 |
| 1,923,585 | 8/33 | Reeves | 251—360 XR |
| 2,336,653 | 12/43 | Taylor | 137—625.3 |
| 2,487,418 | 11/49 | Birkmeier et al. | 137—489.5 |
| 2,860,658 | 11/58 | Senesky | 251—86 XR |
| 2,884,951 | 5/59 | Matthiesen | 137—489.5 |
| 2,902,048 | 9/59 | Ryan | 137—510 |
| 2,917,268 | 12/59 | Soderberg et al. | 251—35 |
| 2,987,073 | 6/61 | Hughes | 137—489.5 |
| 2,998,256 | 8/61 | Lipkins | 137—510 XR |
| 3,051,196 | 8/62 | Miller | 251—360 XR |

M. CARY NELSON, *Primary Examiner.*

MARTIN P. SCHWADRON, *Examiner.*